(12) United States Patent
Morita et al.

(10) Patent No.: US 7,997,067 B2
(45) Date of Patent: Aug. 16, 2011

(54) EXHAUST EMISSION CONTROL DEVICE AND METHOD FOR INTERNAL COMBUSTION ENGINE, AND ENGINE CONTROL UNIT

(75) Inventors: Tomoko Morita, Saitama-ken (JP); Norio Suzuki, Saitama-ken (JP); Katsuji Wada, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 958 days.

(21) Appl. No.: 11/979,161

(22) Filed: Oct. 31, 2007

(65) Prior Publication Data
US 2008/0120969 A1    May 29, 2008

(30) Foreign Application Priority Data
Nov. 24, 2006   (JP) ................................. 2006-317852

(51) Int. Cl.
*F01N 3/00*      (2006.01)

(52) U.S. Cl. ................ 60/285; 60/274; 60/286; 60/295; 60/300; 60/301

(58) Field of Classification Search .................... 60/274, 60/284–287, 295, 299–301
See application file for complete search history.

(56) References Cited

U.S. PATENT DOCUMENTS

| | | | | |
|---|---|---|---|---|
| 5,448,887 A | * | 9/1995 | Takeshima | 60/278 |
| 6,109,024 A | * | 8/2000 | Kinugasa et al. | 60/285 |
| 6,195,987 B1 | * | 3/2001 | Miyashita | 60/285 |
| 6,519,934 B2 | * | 2/2003 | Mashiki | 60/285 |
| 6,718,756 B1 | * | 4/2004 | Okada et al. | 60/286 |
| 6,860,101 B2 | * | 3/2005 | Kako et al. | 60/285 |
| 2006/0168942 A1 | * | 8/2006 | Nakagawa et al. | 60/276 |

FOREIGN PATENT DOCUMENTS

| | | |
|---|---|---|
| JP | 2000-034946 A | 2/2000 |
| JP | 2001-115827 A | 4/2001 |

* cited by examiner

*Primary Examiner* — Thomas E Denion
*Assistant Examiner* — Jesse Bogue
(74) *Attorney, Agent, or Firm* — Arent Fox LLP

(57) ABSTRACT

An exhaust emission control device for an internal combustion engine, which is capable of accurately estimating the amount of NOx trapped by a NOx catalyst even when a catalyst is provided on an upstream side of the NOx catalyst. A catalyst having the function of purifying NOx and a NOx catalyst for trapping NOx under an oxidizing atmosphere are disposed in an exhaust system. The amount of NOx contained in exhaust gases is estimated. A NOx purification performance of the catalyst is calculated. The NOx emission amount is corrected based on the purification performance. An amount of NOx trapped in the NOx catalyst is calculated based on the corrected NOx emission amount. A reducing agent is supplied to an upstream side of the catalyst based on the trapped NOx amount, thereby causing the NOx catalyst to carry out a NOx reducing operation.

15 Claims, 9 Drawing Sheets

EXHAUST EMISSION CONTROL DEVICE AND METHOD FOR INTERNAL COMBUSTION ENGINE, AND ENGINE CONTROL UNIT

BACKGROUND OF THE INVENTION

1. Field of the Invention

The present invention relates to an exhaust emission control device and method for an internal combustion engine, and an engine control unit, for purifying i.e. decreasing exhaust emissions by temporarily trapping NOx contained in exhaust gases emitted from the engine and performing reduction of the trapped NOx.

2. Description of the Related Art

Conventionally, there has been disclosed an exhaust emission control device for an internal combustion engine, e.g. in Japanese Laid-Open Patent Publication (Kokai) No. 2006-207487. This internal combustion engine is a gasoline engine, in which the lean operation in which the air-fuel ratio of a mixture is controlled to a leaner value than a stoichiometric fuel-air ratio is carried out depending on operating conditions of the engine. Further, the exhaust emission control device is provided with a NOx catalyst which is disposed in an exhaust pipe for purifying NOx contained in exhaust gases. In the exhaust emission control device, NOx contained in exhaust gases emitted during the lean operation is trapped in the NOx catalyst. Further, when the amount of the trapped NOx exceeds a predetermined value, a rich spike is executed to enrich the air-fuel ratio of the mixture, whereby unburned components of exhaust gases are supplied to the NOx catalyst as a reducing agent to perform reduction of NOx to thereby purify NOx.

Further, values of the amount of NOx absorbed in the NOx catalyst during the lean operation and the amount of NOx purified and thereby eliminated from the NOx catalyst during execution of the rich spike are set in advance according to operating conditions of the engine (the intake air amount and the load on the engine), and are stored in respective maps. Then, a value of the amount of the absorbed NOx and a value of the amount of the eliminated NOx are read from the respective maps during operation of the engine according to detected operating conditions thereof, and an amount of NOx trapped in the NOx catalyst is estimated by subtracting the read value of the amount of the eliminated NOx from the read value of the amount of the absorbed NOx.

However, when the exhaust emission control device has a three-way catalyst disposed on an upstream side of the NOx catalyst in addition to the NOx catalyst, the three-way catalyst as well occludes and performs reduction of part of NOx contained in exhaust gases, which reduces the amount of NOx actually flowing into the NOx catalyst. Further, during execution of the rich spike, part of NOx having flowed into the NOx catalyst sometimes actually passes through the NOx catalyst without being trapped therein. In such a case, the actual amount of NOx trapped in the NOx catalyst becomes smaller.

In the conventional exhaust emission control device, however, the amount of trapped NOx is estimated only according to the operating conditions of the engine, as described above, which makes it impossible to accurately estimate the amount of NOx actually trapped in the NOx catalyst. Therefore, when the amount of trapped NOx is estimated to be smaller than the actual amount, timing for starting the rich spike, which is set according to the estimated value of the trapped NOx amount, is retarded. This causes insufficient reduction of NOx, resulting in increased exhaust emissions. Inversely, when the amount of trapped NOx is estimated to be larger than the actual amount, the timing for execution of the rich spike is advanced to cause supply of an extra amount of reducing agent. This causes excess amounts of CO and HC to be generated, resulting in increased exhaust emissions and degraded fuel economy.

SUMMARY OF THE INVENTION

It is an object of the present invention to provide an exhaust emission control device and method for an internal combustion engine, and an engine control unit, which are capable of accurately estimating the amount of NOx trapped in a NOx catalyst even when a catalyst is provided on an upstream side of the NOx catalyst, and supplying a just enough amount of reducing agent to the NOx catalyst based on the estimated amount of NOx trapped in the NOx catalyst, thereby making it possible to reduce exhaust emissions and improve fuel economy.

To attain the above object, in a first aspect of the present invention, there is provided an exhaust emission control device for an internal combustion engine, for purifying exhaust gases emitted from the engine into an exhaust system, comprising a catalyst that is disposed in the exhaust system and has a function of purifying NOx, a NOx catalyst that is disposed at a location downstream of the catalyst in the exhaust system, for trapping NOx contained in exhaust gases under an oxidizing atmosphere, and reducing the trapped NOx under a reducing atmosphere, thereby purifying the trapped NOx, NOx emission amount-estimating means for estimating an amount of NOx contained in the exhaust gases emitted from the engine, as a NOx emission amount, purification performance parameter-calculating means for calculating a purification performance parameter indicative of a NOx purification performance of the catalyst, NOx emission amount-correcting means for correcting the estimated NOx emission amount according to the calculated purification performance parameter, trapped NOx amount-calculating means for calculating an amount of NOx trapped by the NOx catalyst as a trapped NOx amount based on the corrected NOx emission amount, and NOx reduction control means for supplying a reducing agent to an upstream side of the catalyst depending on the calculated trapped NOx amount, for controlling the exhaust gases flowing into the NOx catalyst such that the exhaust gases are under the reducing atmosphere, thereby causing the NOx catalyst to carry out an operation for reducing NOx.

With the configuration of this exhaust emission control device, a catalyst and a NOx catalyst are arranged at respective upstream and downstream locations of the exhaust system. NOx contained in exhaust gases emitted from the engine is trapped by the NOx catalyst under an oxidizing atmosphere. Further, the amount of NOx emitted from the engine is estimated, and the purification performance parameter indicative of NOx purification performance of the catalyst is calculated, while an estimated NOx emission amount of emitted NOx is corrected by NOx emission amount-correcting means according to the calculated purification performance parameter. Further, a trapped NOx amount of NOx trapped by the NOx catalyst is calculated based on the corrected NOx emission amount. Then, depending on the calculated trapped NOx amount, the reducing agent is supplied to the upstream side of the catalyst by NOx reduction control means, whereby exhaust gases flowing into the NOx catalyst are controlled such that they are under the reducing atmosphere. Thus, the NOx trapped in the NOx catalyst is reduced to be purified.

As described above, when the catalyst is disposed on the upstream side of the NOx catalyst, and the reducing agent is supplied to the upstream side of the catalyst, part of NOx contained in exhaust gases is occluded and reduced by the catalyst before reaching the NOx catalyst. With the configuration of this exhaust emission control device, the estimated NOx emission amount is corrected according to the purification performance parameter, and the amount of NOx actually flowing into the NOx catalyst is calculated based on the corrected NOx emission amount. This makes it possible to accurately calculate the actual trapped NOx amount while causing the NOx purification performance of the catalyst to be reflected on the calculation, thereby making it possible to properly set the timing for execution of reduction control by the NOx reduction control means depending on the calculated trapped NOx amount. As a result, it is possible to supply a just enough amount of reducing agent to the NOx catalyst, thereby making it possible to reduce exhaust emissions and improve fuel economy without causing insufficient reduction of NOx and excessive generation of HC and CO.

Preferably, the exhaust emission control device further comprises occluded NOx amount-calculating means for calculating an amount of NOx occluded in the catalyst as an occluded NOx amount, and the purification performance parameter-calculating means calculates the purification performance parameter according to the calculated occluded NOx amount.

As described above, part of NOx contained in exhaust gases is occluded in the catalyst before reaching the NOx catalyst. Further, the NOx purification performance of the catalyst has a characteristic of varying with the amount of NOx occluded in the catalyst. With the configuration of the preferred embodiment, the amount of NOx occluded in the catalyst is calculated, and the purification performance parameter is calculated according to the calculated occluded NOx amount, and hence it is possible to calculate the purification performance parameter more accurately based on the amount of NOx occluded in the catalyst.

Preferably, the exhaust emission control device further comprises at least one of catalyst temperature-detecting means for detecting temperature of the catalyst, and space velocity-detecting means for detecting a space velocity of exhaust gases, and the purification performance parameter-calculating means calculates the purification performance parameter according to at least one of the detected temperature of the catalyst and the detected space velocity of exhaust gases.

The NOx purification performance of the catalyst has characteristics of varying with the temperature of the catalyst and the space velocity of exhaust gases, respectively. With the configuration of the preferred embodiment, the purification performance parameter is calculated according to at least one of the detected temperature of the catalyst and the detected space velocity of exhaust gases. This makes it possible to calculate the purification performance parameter more accurately according to at least one of the temperature of the catalyst and the space velocity of exhaust gases.

Preferably, the exhaust emission control device further comprises NOx trapping degree-calculating means for calculating a degree of trapping of NOx by the NOx catalyst, and the trapped NOx amount-calculating means calculates the trapped NOx amount further according to the calculated degree of trapping of NOx.

As described above, part of NOx having flowed into the NOx catalyst sometimes passes through the NOx catalyst without being trapped in the NOx catalyst. With the configuration of the preferred embodiment, the degree of trapping of NOx by the NOx catalyst is calculated, and the trapped NOx amount is calculated further according to the calculated degree of trapping of NOx. This makes it possible to calculate the trapped NOx amount more accurately.

More preferably, the exhaust emission control device further comprises at least one of NOx catalyst temperature-detecting means for detecting temperature of the NOx catalyst, and space velocity-detecting means for detecting a space velocity of exhaust gases, and the NOx trapping degree-calculating means calculates the degree of trapping of NOx according to at least one of the detected temperature of the NOx catalyst and the detected space velocity of exhaust gases.

The degree of trapping NOx by the NOx catalyst has characteristics of changing according to the temperature of the NOx catalyst and the space velocity of exhaust gases, respectively. With the configuration of the preferred embodiment, the degree of trapping of NOx is calculated according to at least one of the detected temperature of the NOx catalyst and the detected space velocity of exhaust gases, so that it is possible to calculate the degree of trapping of NOx more accurately.

To attain the object, in a second aspect of the present invention, there is provided an exhaust emission control method of purifying exhaust gases emitted from an internal combustion engine into an exhaust system thereof, the engine including the exhaust system, a catalyst that is disposed in the exhaust system and has a function of purifying NOx, and a NOx catalyst that is disposed at a location downstream of the catalyst in the exhaust system, for trapping NOx contained in exhaust gases under an oxidizing atmosphere, and reducing the trapped NOx under a reducing atmosphere, thereby purifying the trapped NOx, the exhaust emission control method comprising a NOx emission amount-estimating step of estimating an amount of NOx contained in the exhaust gases emitted from the engine, as a NOx emission amount, a purification performance parameter-calculating step of calculating a purification performance parameter indicative of a NOx purification performance of the catalyst, a NOx emission amount-correcting step of correcting the estimated NOx emission amount according to the calculated purification performance parameter, a trapped NOx amount-calculating step of calculating an amount of NOx trapped by the NOx catalyst as a trapped NOx amount based on the corrected NOx emission amount, and a NOx reduction control step of supplying a reducing agent to an upstream side of the catalyst depending on the calculated trapped NOx amount, for controlling the exhaust gases flowing into the NOx catalyst such that the exhaust gases are under the reducing atmosphere, thereby causing the NOx catalyst to carry out an operation for reducing NOx.

With the configuration of the second aspect of the present invention, it is possible to obtain the same advantageous effects as provided by the first aspect of the present invention.

Preferably, the exhaust emission control method further comprises an occluded NOx amount-calculating step of calculating an amount of NOx occluded in the catalyst as an occluded NOx amount, and the purification performance parameter-calculating step includes calculating the purification performance parameter according to the calculated occluded NOx amount.

Preferably, the exhaust emission control method further comprises at least one of a catalyst temperature-detecting step of detecting temperature of the catalyst, and a space velocity-detecting step of detecting a space velocity of exhaust gases, and the purification performance parameter-calculating step includes calculating the purification performance parameter according to at least one of the detected temperature of the catalyst and the detected space velocity of exhaust gases.

Preferably, the exhaust emission control method further comprises a NOx trapping degree-calculating step of calculating a degree of trapping of NOx by the NOx catalyst, and the trapped NOx amount-calculating step includes calculating the trapped NOx amount further according to the calculated degree of trapping of NOx.

More preferably, the exhaust emission control method further comprises at least one of a NOx catalyst temperature-detecting step of detecting temperature of the NOx catalyst, and a space velocity-detecting step of detecting a space velocity of exhaust gases, and the NOx trapping degree-calculating step includes calculating the degree of trapping of NOx according to at least one of the detected temperature of the NOx catalyst and the detected space velocity of exhaust gases.

With the configurations of these preferred embodiments, it is possible to obtain the same advantageous effects as provided by the respective corresponding preferred embodiments of the first aspect of the present invention.

To attain the object, in a third aspect of the present invention, there is provided an engine control unit including a control program for causing a computer to execute an exhaust emission control method of purifying exhaust gases emitted from an internal combustion engine into an exhaust system thereof, the engine including the exhaust system, a catalyst that is disposed in the exhaust system and has a function of purifying NOx, and a NOx catalyst that is disposed at a location downstream of the catalyst in the exhaust system, for trapping NOx contained in exhaust gases under an oxidizing atmosphere, and reducing the trapped NOx under a reducing atmosphere, thereby purifying the trapped NOx, wherein the control program causes the computer to estimate an amount of NOx contained in the exhaust gases emitted from the engine, as a NOx emission amount, calculate a purification performance parameter indicative of a NOx purification performance of the catalyst, correct the estimated NOx emission amount according to the calculated purification performance parameter, calculate an amount of NOx trapped by the NOx catalyst as a trapped NOx amount based on the corrected NOx emission amount, and supply a reducing agent to an upstream side of the catalyst depending on the calculated trapped NOx amount, for controlling the exhaust gases flowing into the NOx catalyst such that the exhaust gases are under the reducing atmosphere, thereby causing the NOx catalyst to carry out an operation for reducing NOx.

With the configuration of the third aspect of the present invention, it is possible to obtain the same advantageous effects as provided by the first aspect of the present invention.

Preferably, the control program causes the computer to calculate an amount of NOx occluded in the catalyst as an occluded NOx amount, and calculate the purification performance parameter according to the calculated occluded NOx amount.

Preferably, the control program causes the computer to perform at least one of detection of temperature of the catalyst, and detection of a space velocity of exhaust gases, and calculate the purification performance parameter according to at least one of the detected temperature of the catalyst and the detected space velocity of exhaust gases.

Preferably, the control program causes the computer to calculate a degree of trapping of NOx by the NOx catalyst, and calculate the trapped NOx amount further according to the calculated degree of trapping of NOx.

More preferably, the control program causes the computer to perform at least one of detection of temperature of the NOx catalyst, and detection of a space velocity of exhaust gases, and calculate the degree of trapping of NOx according to at least one of the detected temperature of the NOx catalyst and the detected space velocity of exhaust gases.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
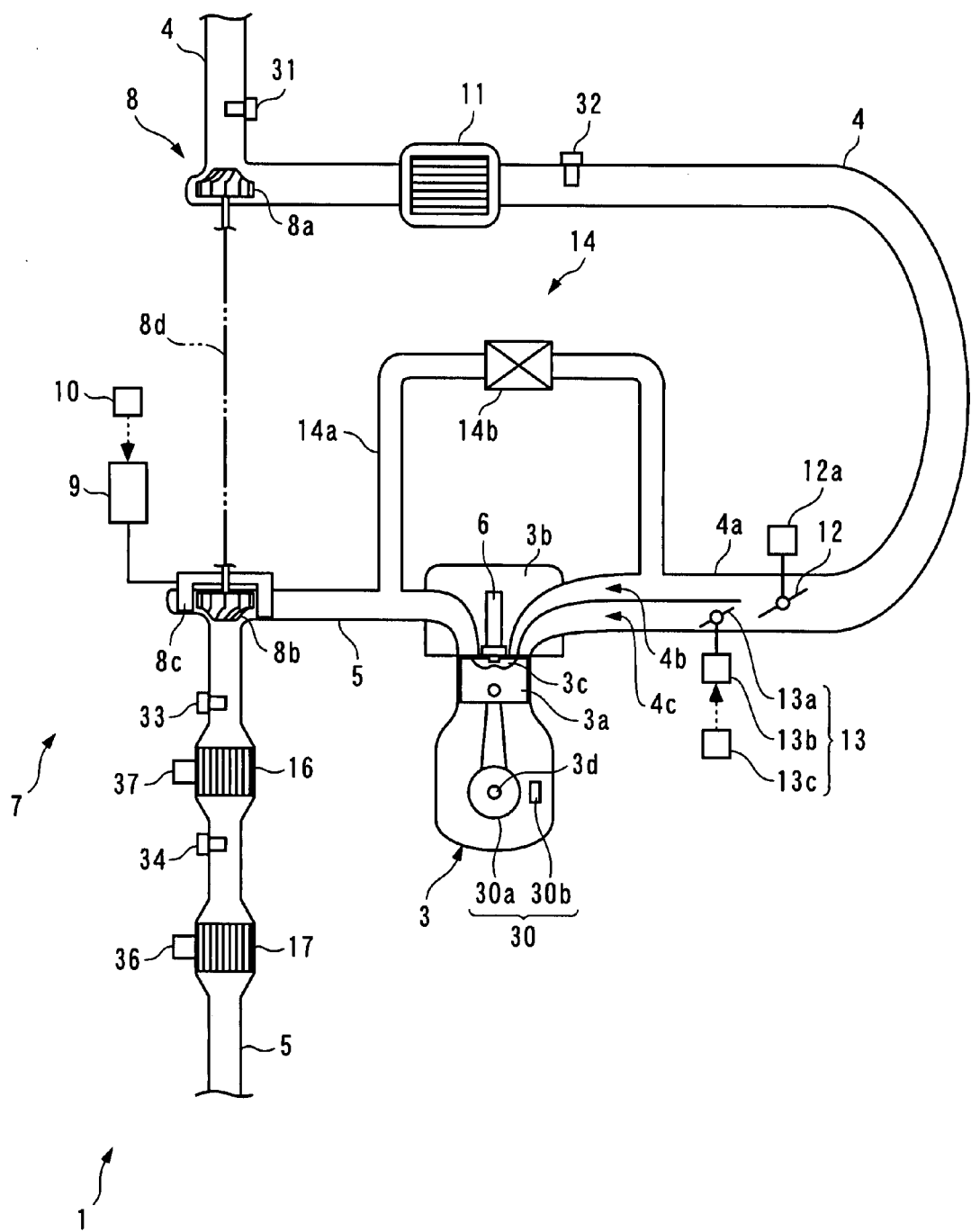
FIG. 1 is a schematic diagram of an internal combustion engine to which is applied an exhaust emission control device according to the present invention.

Hereafter, an exhaust emission control device according to an embodiment of the present invention will be described with reference to the drawings. FIG. 1 is a diagram showing the exhaust emission control device 1 to which is applied the present invention, and an internal combustion engine 3. The engine (hereinafter simply referred to as "the engine") 3 is a diesel engine that has e.g. four cylinders (only one of which is shown), and is installed on a vehicle.

A combustion chamber 3c is defined between a piston 3a and a cylinder head 3b for each cylinder of the engine 3. The cylinder head 3b has an intake pipe 4 and an exhaust pipe 5 connected thereto, with a fuel injection valve (hereinafter referred to as "the injector") 6 mounted therethrough such that it faces the combustion chamber 3c.

The injector 6 is inserted into the combustion chamber 3c through a central portion of the top wall thereof, and is connected to a high-pressure pump and a fuel tank, neither of which is shown, in the mentioned order via a common rail. A fuel injection amount TOUT of fuel injected from the injector 6 is controlled by controlling the valve-opening time period thereof by a drive signal from the ECU 2 (see FIG. 2).

A magnet rotor 30a is mounted on a crankshaft 3d of the engine 3. The magnet rotor 30a and an MRE pickup 30b form a crank angle sensor 30 which delivers a CRK signal and a TDC signal, which are both pulse signals, to the ECU 2 along with rotation of the crankshaft 3*d*.

Each pulse of the CRK signal is generated whenever the crankshaft 3*d* rotates through a predetermined crank angle (e.g. 30°). The ECU 2 calculates rotational speed (hereinafter referred to as "the engine speed") NE of the engine 3 based on the CRK signal. The TDC signal indicates that the piston 3*a* of each cylinder is at a predetermined crank angle position in the vicinity of the top dead center (TDC) at the start of the intake stroke thereof, and in the case of the four-cylinder engine of the illustrated example, it is delivered whenever the crankshaft 3*d* rotates through 180 degrees.

The intake pipe 4 has a supercharging device 7 disposed therein. The supercharging device 7 is comprised of a supercharger 8 formed by a turbo charger, an actuator 9 connected to the supercharger 8, and a vane opening control valve 10.

The supercharger 8 includes a compressor blade 8*a* rotatably mounted in the intake pipe 4, a rotatable turbine blade 8*b* and a plurality of rotatable variable vanes 8*c* (only two of which are shown) provided in the exhaust pipe 5, and a shaft 8*d* integrally formed with the two blades 8*a* and 8*b* such that the shaft 8*d* connects them. In the supercharger 8, as the turbine blade 8*b* is driven for rotation by exhaust gases flowing through the exhaust pipe 5, the compressor blade 8*a* integrally formed with the shaft 8*d* which connects between the compressor blade 8*a* and the turbine blade 8*b* is also rotated, whereby the supercharger 8 is caused to perform a supercharging operation for pressurizing intake air in the intake pipe 4.

The actuator 9 is of a diaphragm type which is operated by negative pressure, and is mechanically connected to the variable vanes 8*c*. The actuator 9 has negative pressure supplied from a negative pressure pump, not shown, through a negative pressure supply passage, not shown. The vane opening control valve 10 is disposed in an intermediate portion of the negative pressure supply passage. The vane opening control valve 10 is formed by an electromagnetic valve, and the degree of opening thereof is controlled by a drive signal from the ECU 2, whereby negative pressure to be supplied to the actuator 9 is changed to change the degree of opening of each variable vane 8*c*. Thus, boost pressure is controlled.

An intercooler 11 of a water cooling type, and a throttle valve 12 (NOx reduction control means) are inserted into the intake pipe 4 at respective locations downstream of the supercharger 8 from upstream to downstream in the mentioned order. The intercooler 11 is provided for cooling intake air e.g. when the temperature of the intake air is raised by the supercharging operation of the supercharging device 7. An actuator 12*a* comprised e.g. of a DC motor is connected to the throttle valve 12. The opening TH of the throttle valve 12 (hereinafter referred to as "the throttle valve opening TH") is controlled by controlling the duty factor of electric current supplied to the actuator 12*a* by the ECU 2.

Further, the intake pipe 4 has an air flow sensor 31 inserted therein at a location upstream of the supercharger 8, and a boost pressure sensor 32 inserted therein between the intercooler 11 and the throttle valve 12. The air flow sensor 31 detects an intake air amount QA, to deliver a signal indicative of the sensed intake air amount QA to the ECU 2, while the boost pressure sensor 32 detects boost pressure PACT in the intake pipe 4, to deliver a signal indicative of the sensed boost pressure PACT to the ECU 2.

Furthermore, the intake pipe 4 has an intake manifold 4*a* divided into a swirl passage 4*b* and a bypass passage 4*c* between the collecting section of the intake manifold 4*a* and each branch portion thereof. The passages 4*b* and 4*c* communicate with the combustion chamber 3*c* via each intake port.

The bypass passage 4*c* is provided with a swirl device 13 for generating a swirl in the combustion chamber 3*c*. The swirl device 13 is comprised of a swirl valve 13*a*, an actuator 13*b* for actuating the swirl valve 13*a* to open and close the same, and a swirl control valve 13*c*. The actuator 13*b* and the swirl control valve 13*c* are configured similarly to the actuator 9 and the vane opening control valve 10 of the supercharging device 7, respectively. The swirl control valve 13*c* is connected to the above-described negative pressure pump. With this arrangement, the degree of opening of the swirl control valve 13*c* is controlled by a drive signal from the ECU 2, whereby negative pressure supplied to the actuator 13*b* is changed to change the degree of opening of the swirl valve 13*a*, whereby the strength of the swirl is controlled.

Further, the engine 3 is provided with an EGR device 14 that has an EGR pipe 14*a* and an EGR control valve 14*b*. The EGR pipe 14*a* connects between the intake pipe 4 and the exhaust pipe 5, more specifically, between the swirl passage 4*b* in the collecting section of the intake manifold 4*a* and a portion of the exhaust pipe 5 at a location upstream of the supercharger 8. Part of exhaust gases exhausted from the engine 3 is recirculated into the intake pipe 4 via the EGR pipe 14*a* as EGR gases, whereby combustion temperature in the combustion chamber 3*c* is lowered to decrease NOx contained in the exhaust gases.

The EGR control valve 14*b* is implemented by a linear solenoid valve inserted into the EGR pipe 14*a*, and the valve lift amount VLACT thereof is linearly controlled by a drive signal under duty ratio control from the ECU 2, whereby the amount of EGR gases is controlled.

A three-way catalyst 16 (catalyst) and a NOx catalyst 17 are provided in the exhaust pipe 5 at respective locations downstream of the supercharger 8 from upstream to downstream in the mentioned order. The three-way catalyst 16 oxidizes HC and CO and performs reduction of NOx in exhaust gases under a stoichiometric atmosphere, to thereby purify i.e. decrease exhaust emissions. The NOx catalyst 17 traps (absorbs) NOx contained in exhaust gases under an oxidizing atmosphere in which the concentration of oxygen in exhaust gases is high, and performs reduction of the trapped NOx under a reducing atmosphere in which a large amount of reducing agent is contained in exhaust gases, to thereby purify exhaust emissions.

Further, the NOx catalyst 17 is provided with a NOx catalyst temperature sensor 36 for detecting the temperature TLNC of the NOx catalyst 17 (hereinafter referred to as "the NOx catalyst temperature TLNC"), while the three-way catalyst 16 is provided with a three-way catalyst temperature sensor 37 for detecting the temperature TTWC of the three-way catalyst 16 (hereinafter referred to as "the three-way catalyst temperature TTWC"). These sensors 36 and 37 deliver respective signals indicative of the detected NOx catalyst temperature TLNC and three-way catalyst temperature TTWC to the ECU 2.

Furthermore, a first LAF sensor 33 and a second LAF sensor 34 are inserted into the exhaust pipe 5 at respective locations upstream of and downstream of the three-way catalyst 16. The first LAF sensor 33 and the second LAF sensor 34 linearly detect the concentrations VLAF1 and VLAF2 of oxygen in exhaust gases, respectively. The ECU 2 calculates first and second actual air-fuel ratios AF1ACT and AF2ACT indicative of respective air-fuel ratios corresponding to the detected oxygen concentrations VLAF1 and VLAF2, respectively. Further, an accelerator pedal opening sensor 35 detects the amount AP of operation (stepped-on amount) of an accelerator pedal, not shown (hereinafter referred to as "the accelerator pedal opening AP"), and delivers a signal indicative of the sensed accelerator pedal opening AP to the ECU 2.

In the present embodiment, the ECU 2 forms NOx emission amount-estimating means, purification performance parameter-calculating means, NOx emission amount-correcting means, trapped NOx amount-calculating means, NOx reduction control means, occluded NOx amount-calculating means, space velocity-detecting means, and NOx trapping degree-calculating means, and is implemented by a microcomputer comprised of an I/O interface, a CPU, a RAM, and a ROM. The detection signals from the aforementioned sensors 30 to 37 are input to the CPU after the I/O interface performs A/D conversion and waveform shaping thereon.

In response to these input signals, the CPU determines an operating condition of the engine 3, and based on the determined operating condition of the engine, performs engine control, such as fuel injection amount control and intake air amount control, in accordance with control programs read from the ROM. Further, the CPU determines whether or not rich spike should be executed as reduction control for performing reduction of NOx trapped in the NOx catalyst 17, and performs the rich spike according to the result of the determination. It should be noted as described hereinafter, the rich spike is performed by increasing the fuel injection amount TOUT and decreasing the intake air amount QA, thereby enriching the air-fuel ratio of a mixture supplied to the combustion chamber 3c, to supply unburned components of fuel to the NOx catalyst 17 as a reducing agent.

Figure 3:
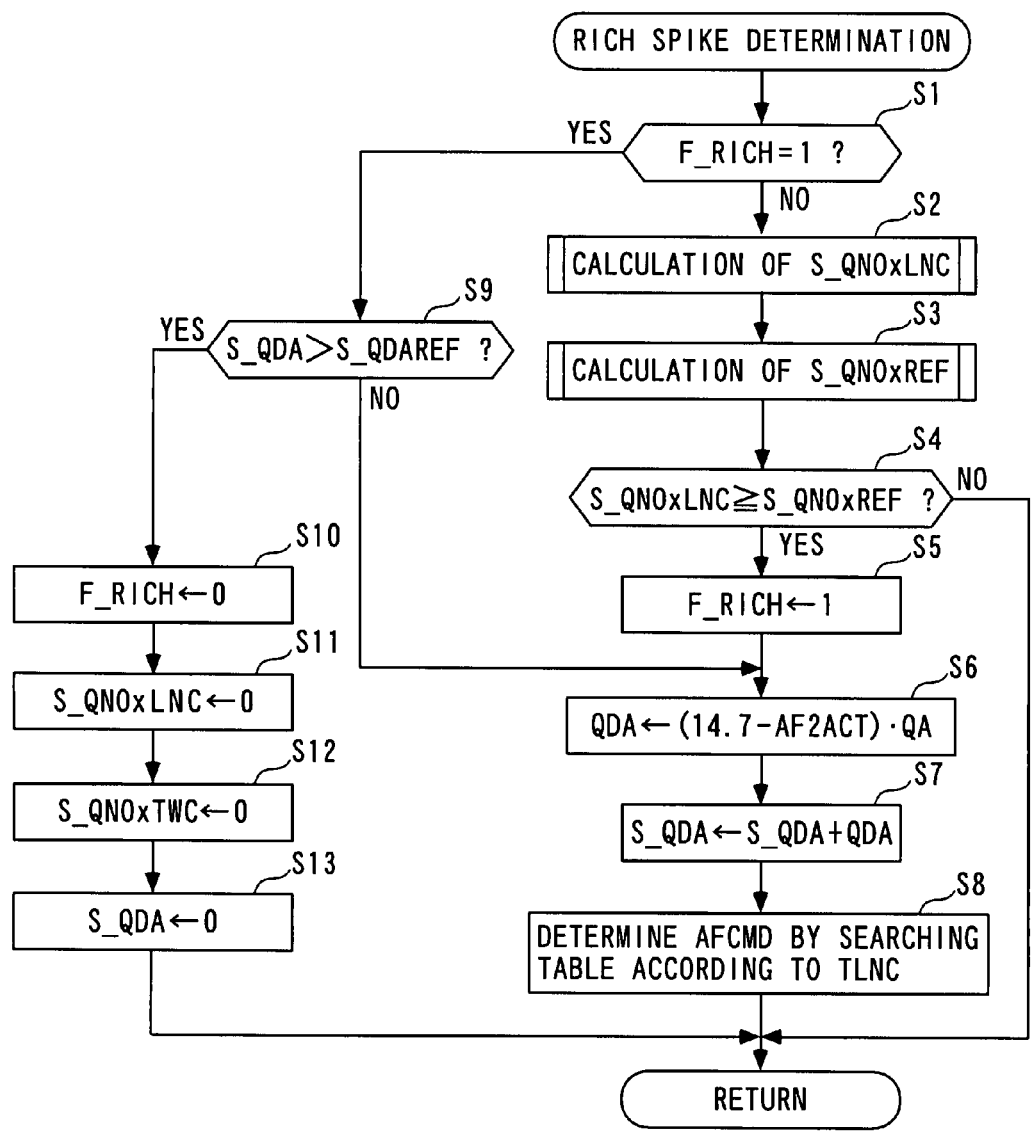
FIG. 3 is a flowchart showing a process for determining execution of rich spike.

FIG. 3 shows a process for determining the execution of the rich spike. The process is executed whenever a predetermined time period elapses. First, in a step 1 (shown as S1 in abbreviated form in FIG. 3; the following steps are also shown in abbreviated form), it is determined whether or not a rich spike flag F_RICH is equal to 1. As described hereinafter, the rich spike flag F_RICH is set to 1 if conditions for executing the rich spike are satisfied.

If the answer to the question of the step 1 is negative (NO), i.e. if the rich spike is not being executed, the process proceeds to a step 2, wherein the cumulative value S_QNOxLNC of the amount of trapped NOx (trapped NOx amount) is calculated. The cumulative value S_QNOxLNC corresponds to the total amount of NOx actually trapped in the NOx catalyst 17, and is calculated by an S_QNOxLNC-calculating process, described hereinafter.

Then, in a step 3, a trapped NOx amount reference value S_QNOxREF is calculated. Detailed description thereof will be given hereinafter.

Next, in a step 4, it is determined whether or not the cumulative value S_QNOxLNC of the trapped NOx amount is not smaller than the trapped NOx amount reference value S_QNOxREF. If the answer to this question is negative (NO), it is judged that since the amount of NOx trapped in the NOx catalyst 17 is still small, the rich spike should not be executed, and the present process is immediately terminated. On the other hand, if the answer to the question of the step 4 is affirmative (YES), i.e. if S_QNOxLNC≧S_QNOxREF holds, it is judged that the rich spike should be executed, so that the rich spike flag F_RICH is set to 1 (step 5), followed by starting the rich spike.

Then, in a step 6, the amount QDA of reducing agent (reducing agent amount QDA) is calculated. The reducing agent amount QDA is obtained by multiplying a value obtained by subtracting the second actual air-fuel ratio AF2ACT from 14.7 representative of a stoichiometric air-fuel ratio, by the intake air amount QA corresponding to the flow rate of exhaust gases. It should be noted that the space velocity SV of exhaust gases may be used in place of the intake air amount QA.

Then, in a step 7, the reducing agent amount QDA calculated in the step 6 is added to the cumulative value S_QDA of the reducing agent amount, calculated thus far, whereby the current cumulative value S_QDA of the reducing agent amount is calculated. This cumulative value S_QDA corresponds to the total amount of reducing agent actually supplied to the NOx catalyst 17 by execution of rich spike.

Figure 6:
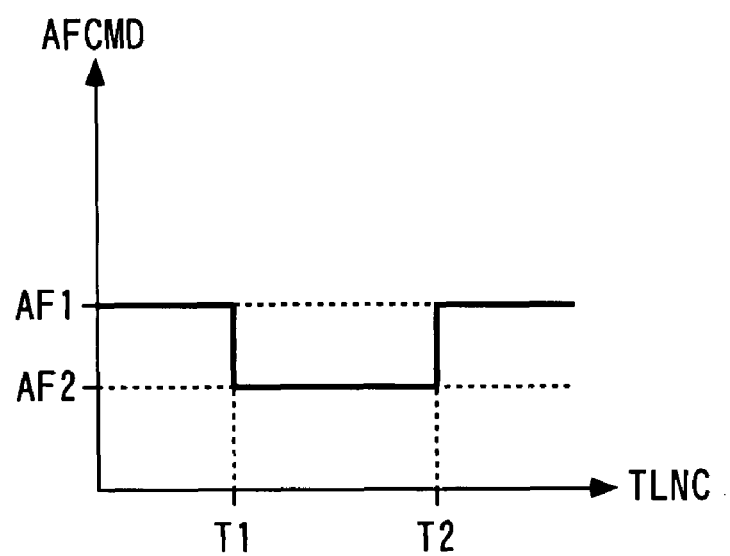
FIG. 6 is a diagram showing an example of an AFCMD table for use in the FIG. 3 process.

After that, in a step 8, a target air-fuel ratio AFCMD is determined by searching an AFCMD table according to the temperature TLNC of the NOx catalyst (NOx catalyst temperature TLNC), followed by terminating the present process. As shown in FIG. 6, in the AFCMD table, when the NOx catalyst temperature TLNC is not higher than a first predetermined temperature T1 (e.g. 200° C.), and when the NOx catalyst temperature TLNC is not lower than a second predetermined temperature T2 (e.g. 400° C.) higher than the first predetermined temperature T1, the target air-fuel ratio AFCMD is set to a slightly rich first air-fuel ratio AF1 (e.g. 14.3) which is slightly lower than 14.7 corresponding to the stoichiometric air-fuel ratio. This is to perform reduction control mainly by the three-way catalyst 16 since it is estimated that the NOx catalyst 17 is not active enough when the temperature TLNC is within the above-described ranges.

On the other hand, when the NOx catalyst temperature TLNC is between the first predetermined temperature T1 and the second predetermined temperature T2, it is estimated that the NOx catalyst 17 is active enough, and hence to perform reduction control by the NOx catalyst 17, the target air-fuel ratio AFCMD is set to a richer second air-fuel ratio AF2 (e.g. 14.0) richer than the first air-fuel ratio AF1.

On the other hand, if the answer to the question of the step 1 is affirmative (YES), i.e. if the rich spike is being executed, it is determined whether or not the cumulative value S_QDA of the reducing agent amount is larger than a reducing agent amount reference value S_QDAREF (step 9). The reducing agent amount reference value S_QDAREF corresponds to the amount of reducing agent required for reduction of the NOx trapped in the NOx catalyst 17, and is set based on the trapped NOx amount reference value S_QNOxREF calculated in the step 3.

If the answer to this question is negative (NO), i.e. if S_QDA≦S_QDAREF holds, it is judged that the required amount of reducing agent is not supplied to the NOx catalyst 17 yet, and the reduction of NOx has not been completed, so that the step 6 et seq. are executed to continue the rich spike and calculate the cumulative value S_QDA of the reducing agent amount, followed by terminating the present process.

On the other hand, if the answer to this question is affirmative (YES), i.e. if S_QDA>S_QDAREF holds, it is judged that the required amount of reducing agent is supplied to the NOx catalyst 17, and the reduction of NOx has been completed, so that the rich spike flag F_RICH is set to 0 (step 10), to terminate the rich spike. Then, the cumulative value S_QNOxLNC of the trapped NOx amount, the cumulative value S_QNOxTWC of the amount of occluded NOx (occluded NOx amount), referred to hereinafter, and the cumulative value S_QDA of the reducing agent amount are reset to 0 (steps 11 to 13), followed by terminating the present process.

Figure 2:
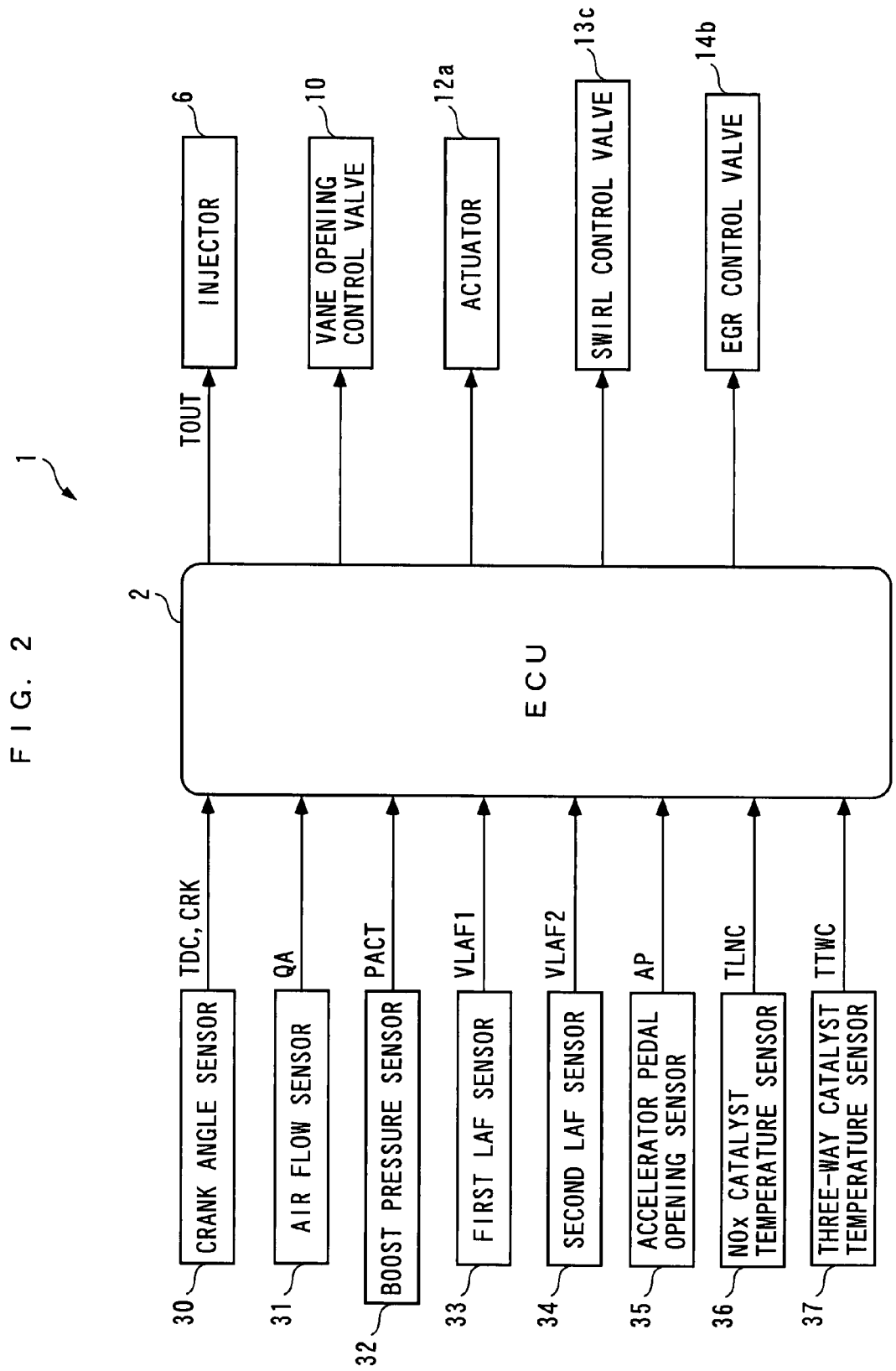
FIG. 2 is a diagram showing part of the exhaust emission control device.
Figure 7:
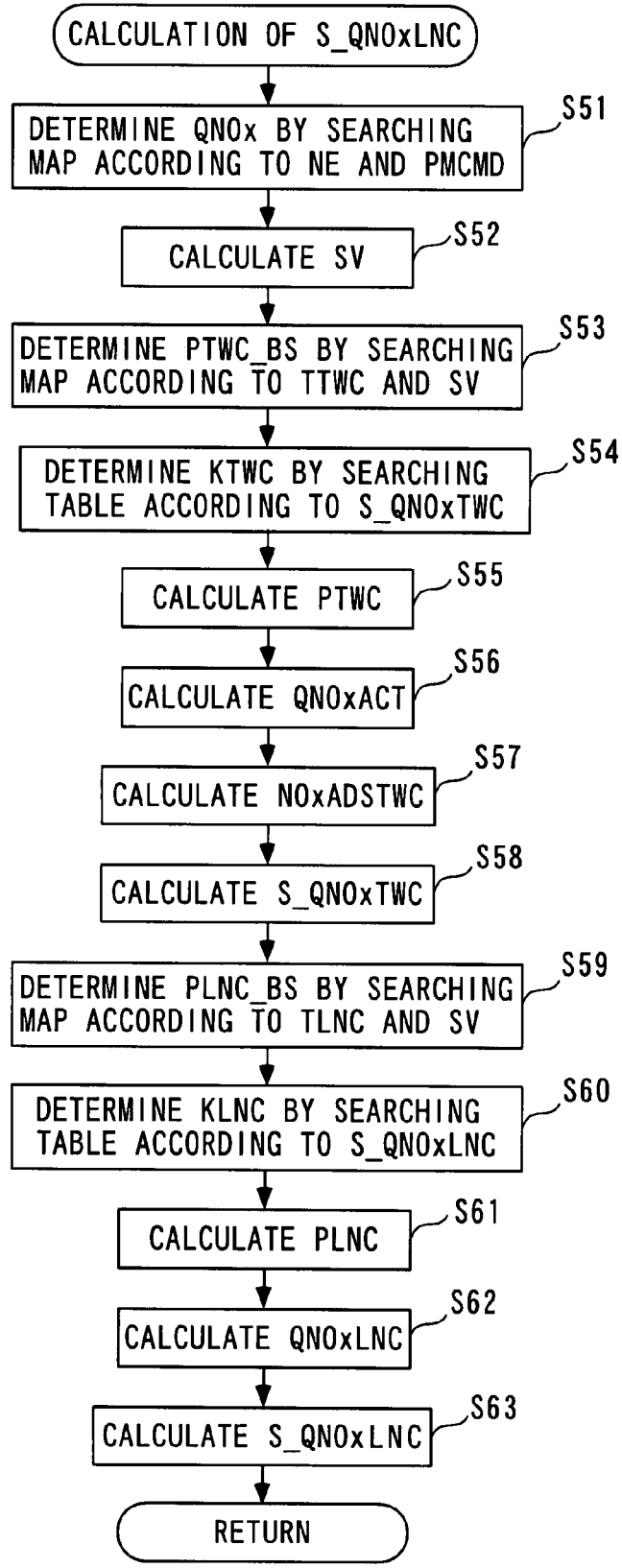
FIG. 7 is a flowchart showing a process for calculating S_QNOxLNC.

FIG. 7 shows a process for calculating the cumulative value S_QNOxLNC of the trapped NOx amount, executed in the step 2 in FIG. 2. In this process, first, in a step 51, the amount QNOx of emitted NOx (NOx emission amount) is determined by searching a map, not shown, according to the engine speed NE and demanded torque PMCMD. The NOx emission amount QNOx corresponds to the amount of NOx contained in exhaust gases emitted from the combustion chamber $3c$ in the current combustion cycle. It should be noted that the demanded torque PMCMD is determined by searching a map, not shown, according to the engine speed NE and the accelerator pedal opening AP.

Then, the space velocity SV of exhaust gases is calculated (step 52). The space velocity SV is determined by searching a map, not shown, according to the engine speed NE and the intake air amount QA.

Figure 8:
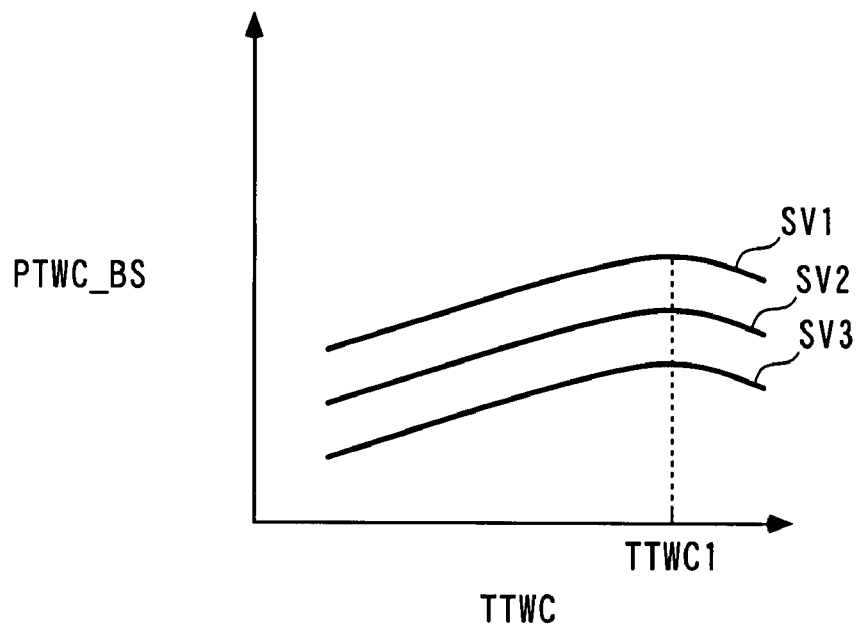
FIG. 8 is a diagram showing an example of a PTWC_BS map for use in the FIG. 5 process.

Next, the basic value PTWC_BS of a NOx purification ratio PTWC is determined by searching a map shown in FIG. 8 according to the three-way catalyst temperature TTWC and the space velocity SV (step 53). The NOx purification ratio PTWC represents a ratio (%) of the amount of NOx reduced by the three-way catalyst 16 to the amount of NOx having flowed into the three-way catalyst 16.

In this map, the basic value PTWC_BS is set to a maximum value when the three-way catalyst temperature TTWC is equal to a predetermined temperature TTWC1, and set to a smaller value as the three-way catalyst temperature TTWC becomes higher or lower than the predetermined temperature TTWC1. Further, when the three-way catalyst temperature TTWC is the same, the basic value PTWC_BS is set to a smaller value as the space velocity SV is higher (SV1<SV2<SV3).

Figure 9:
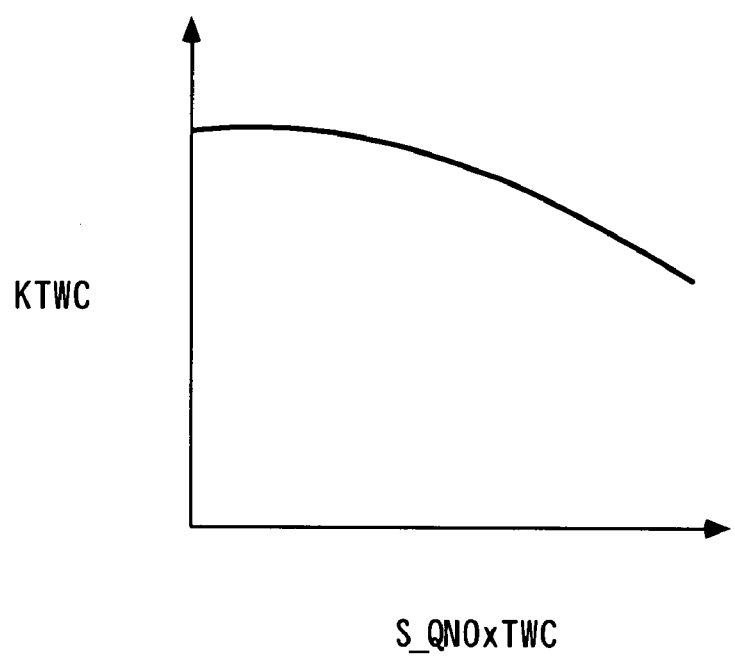
FIG. 9 is a diagram showing an example of a KTWC table for use in the FIG. 5 process.

Then, a correction coefficient KTWC is determined by searching a table shown in FIG. 9 according to the cumulative value S_QNOxTWC of the occluded NOx amount (step 54). The cumulative value S_QNOxTWC corresponds to the total amount of NOx occluded in the three-way catalyst 16, and is calculated in a step 58, referred to hereinafter. Since the NOx purification performance of the three-way catalyst has a characteristic that it becomes lower as the occluded NOx amount is larger, in the above map, the correction coefficient KTWC is set to a smaller value as the cumulative value S_QNOxTWC is larger.

Next, the NOx purification ratio PTWC is calculated using the basic value PTWC_BS calculated in the step 53 and the correction coefficient KTWC, by the following equation (1) (step 55):

$$PTWC = PTWC\_BS \times KTWC \qquad (1)$$

Then, an inflow NOx amount QNOxACT is calculated using the calculated NOx purification ratio PTWC, by the following equation (2) (step 56):

$$QNOxACT = QNOx \times (1 \leq PTWC/100) \qquad (2)$$

The inflow NOx amount QNOxACT corresponds to the amount of NOx which passes through the three-way catalyst 16 to flow into the NOx catalyst 17 without being occluded or reduced by the three-way catalyst 16.

Then, the amount NOxADSTWC of occluded NOx is calculated (step 57) by the following equation (3):

$$NOxADSTWC = QNOx \times PTWC/100 \qquad (3)$$

The amount NOxADSTWC of occluded NOx corresponds to the amount of NOx which does not reach the NOx catalyst 17 e.g. by being occluded by the three-way catalyst 16. More specifically, the amount NOxADSTWC includes the amount of NOx reduced by the reducing agent under an oxidizing atmosphere, and the amount of NOx occluded in the three-way catalyst 16 by its NOx-occluding capability.

Then, the current cumulative value S_QNOxTWC of the occluded NOx amount is calculated by adding the amount NOxADSTWC of occluded NOx to the cumulative value S_QNOxTWC of the occluded NOx amount, calculated thus far (step 58), using the following equation (4):

$$S\_QNOxTWC = S\_QNOxTWC + NOxADSTWC \qquad (4)$$

Figure 10:
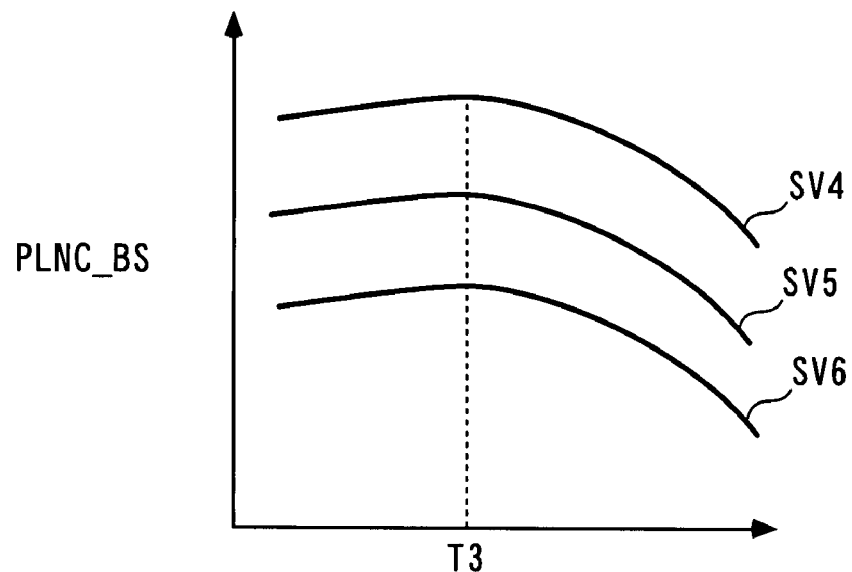
FIG. 10 is a diagram showing an example of a PLNC_BS map for use in the FIG. 5 process.

Then, the basic value PLNC_BS of a NOx trapping ratio PLNC is determined by searching a map shown in FIG. 10 according to the NOx catalyst temperature TLNC (step 59). The NOx trapping ratio PLNC represents a ratio (%) of the amount of NOx actually trapped in the NOx catalyst 17 to the amount of NOx flowing into the NOx catalyst 17.

In this map, the basic value PLNC_BS is set to a smaller value as the NOx catalyst temperature TLNC is higher, in a region where the NOx catalyst temperature TLNC is not lower than a third predetermined temperature T3, while in a region where the NOx catalyst temperature TLNC is lower than the third predetermined temperature T3, the basic value PLNC_BS is set to a substantially fixed value. This is to reflect a characteristic of the degree of trapping of NOx by the NOx catalyst, which changes according to the temperature of the NOx catalyst.

Further, when the NOx catalyst temperature TLNC is the same, the basic value PLNC_BS is set to a smaller value as the space velocity SV becomes higher (SV4<SV5<SV6). This is to reflect a characteristic of the degree of trapping of NOx by the NOx catalyst, which changes according to the space velocity of exhaust gases.

Figure 11:
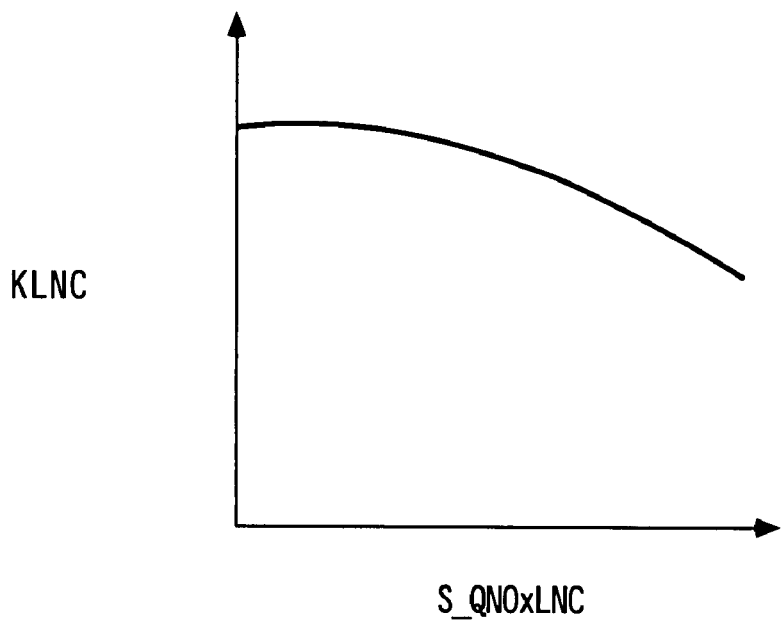
FIG. 11 is a diagram showing an example of a KLNC table for use in the FIG. 5 process.

Then, a correction coefficient KLNC is determined by searching a table shown in FIG. 11 according to the cumulative value S_QNOxLNC of the trapped NOx amount (step 60). The cumulative value S_QNOxLNC corresponds to the total amount of NOx trapped in the NOx catalyst 17, as mentioned hereinabove, and is calculated in a step 63, referred to hereinafter. Since the NOx trapping performance of the NOx catalyst has a characteristic that it becomes lower as the trapped NOx amount is larger, in the above table, the correction coefficient KLNC is set to a smaller value as the cumulative value S_QNOxLNC is larger.

Next, the NOx trapping ratio PLNC is calculated using the basic value PLNC_BS calculated in the step 59 and the correction coefficient KLNC, by the following equation (5) (step 61):

$$PLNC = PLNC\_BS \times KLNC \qquad (5)$$

Then, the trapped NOx amount QNOxLNC is calculated using the inflow NOx amount QNOxACT calculated in the step 56 and the NOx trapping ratio PLNC, by the following equation (6) (step 62):

$$QNOxLNC = QNOxACT \times PLNC/100 \qquad (6)$$

The trapped NOx amount QNOxLNC corresponds to the amount of NOx actually trapped in the NOx catalyst 17 in the current cycle.

Next, the current cumulative value S_QNOxLNC of the trapped NOx amount is calculated by adding the trapped NOx amount QNOxLNC to the cumulative value S_QNOxLNC of the trapped NOx amount calculated thus far (step 63), followed by terminating the present process, using the following equation (7):

$$S\_QNOxLNC = S\_QNOxLNC + QNOxLNC \qquad (7)$$

The cumulative value S_QNOxLNC calculated as above is compared with the trapped NOx amount reference value S_QNOxREF in the step 4 in FIG. 3. When the cumulative value S_QNOxLNC exceeds the trapped NOx amount reference value S_QNOxREF, the rich spike is started.

As described above, according to the present embodiment, the amount of NOx emitted from the engine 3 (NOx emission amount QNOx) is corrected based on the NOx purification ratio PTWC representative of the NOx purification performance of the three-way catalyst, whereby the inflow NOx amount QNOxACT of NOx flowing into the NOx catalyst 17 is calculated. Further, the NOx trapping ratio PLNC representing the degree of trapping of NOx by the NOx catalyst 17 is calculated, and based on the calculated NOx trapping ratio PLNC and the inflow NOx amount QNOxACT, the cumulative value S_QNOxLNC of the trapped NOx amount is calculated which represents the amount of NOx trapped in the NOx catalyst 17.

Therefore, it is possible to accurately calculate the cumulative value S_QNOxLNC of the trapped NOx amount while causing the NOx purification performance of the three-way catalyst 16 and the degree of trapping of NOx by the NOx catalyst 17 to be reflected on the calculation. This makes it possible to execute the rich spike in appropriate timing based on the results of comparison between the cumulative value S_QNOxLNC of the trapped NOx amount and the trapped NOx amount reference value S_QNOxREF. As a result, it is possible to supply a just enough amount of reducing agent to the NOx catalyst 17, thereby making it possible to decrease exhaust emissions to improve fuel economy without causing insufficient reduction of NOx and excessive generation of HC and CO.

Further, the NOx purification ratio PTWC of the three-way catalyst 16 is calculated based on the cumulative value S_QNOxTWC of the amount of NOx occluded in the three-way catalyst 16, the three-way catalyst temperature TTWC, and the space velocity SV of exhaust gases, so that it is possible to accurately calculate the NOx purification ratio PTWC while causing characteristics dependent on the above parameters to be reflected on the calculation, thereby making it possible to accurately calculate the inflow NOx amount QNOxACT.

Further, the NOx trapping ratio PLNC of the NOx catalyst 17 is calculated based on the NOx catalyst temperature TLNC, the space velocity SV of exhaust gases, and the cumulative value S_QNOxLNC of the trapped NOx amount, and therefore it is possible to accurately calculate the NOx trapping ratio PLNC while causing characteristics thereof dependent on the above parameters to be reflected on the calculation. This makes it possible to accurately calculate the cumulative value S_QNOxLNC of the trapped NOx amount based on the NOx trapping ratio PLNC and the inflow NOx amount QNOxACT, calculated as above.

Figure 4:
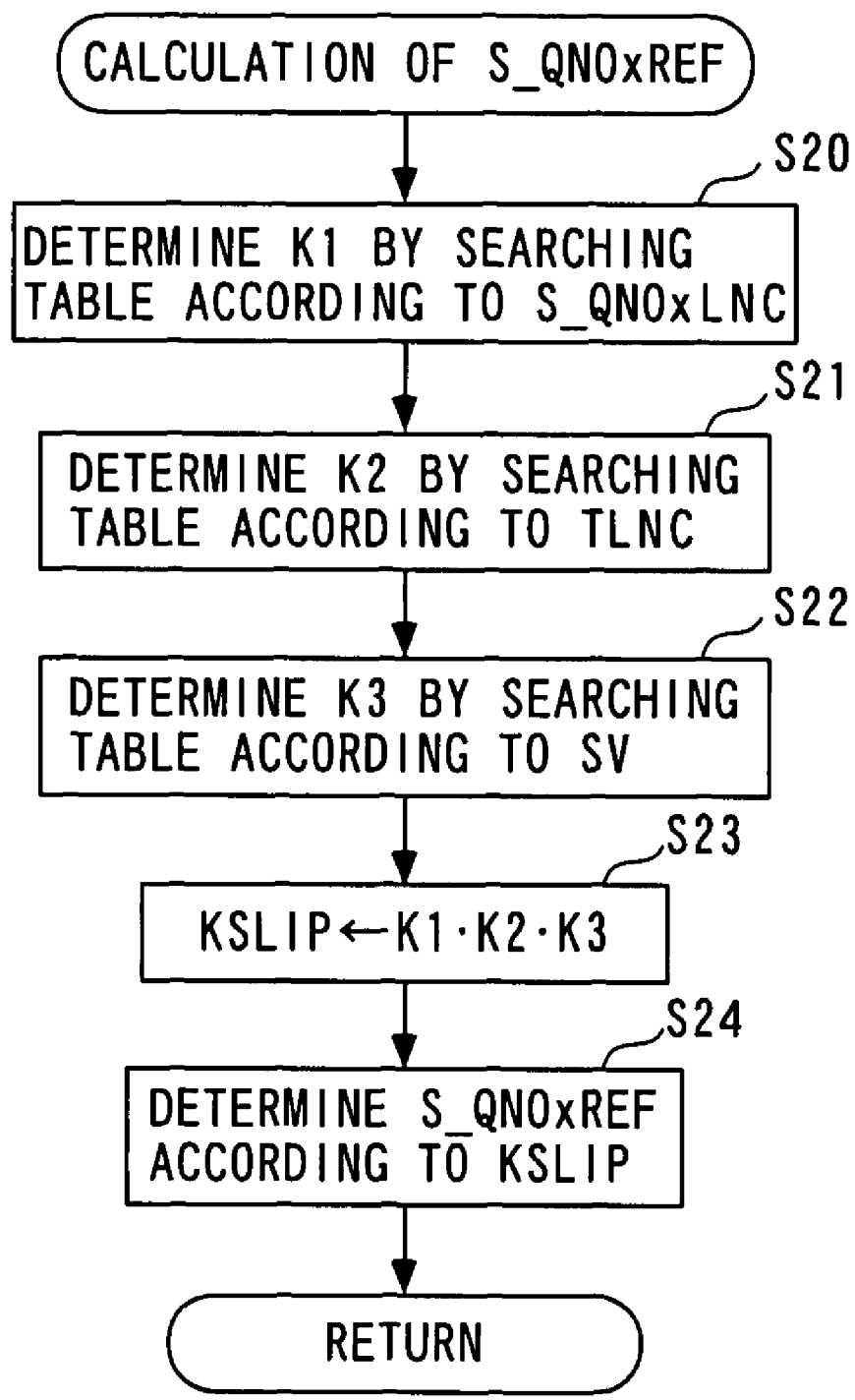
FIG. 4 is a flowchart showing a process for calculating S_QNOxREF.

FIG. 4 shows a process for calculating the trapped NOx amount reference value S_QNOxREF, executed in the step 3 in FIG. 3. In this process, the trapped NOx amount reference value S_QNOxREF is calculated by taking into account parameters influencing NOx slip (phenomenon in which during reduction control of NOx, part of NOx trapped by a NOx catalyst desorbs from the NOx catalyst without being reduced) and characteristics of the NOx slip.

First, in a step 20, a first coefficient K1 is determined by searching a table, not shown, according to the cumulative value S_QNOxLNC of the trapped NOx amount. In this table, the first coefficient K1 is set to a larger value as the cumulative value S_QNOxLNC is larger, based on a characteristic of the amount of NOx slip dependent on the cumulative value S_QNOxLNC.

Then, in a step 21, a second coefficient K2 is determined by searching a table, not shown, according to the NOx catalyst temperature TLNC. In this table, the second coefficient K2 is set to a smaller value as the NOx catalyst temperature TLNC is higher, based on a characteristic of the amount of NOx slip dependent on the NOx catalyst temperature TLNC.

Next, in a step 22, a third coefficient K3 is determined by searching a table, not shown, according to the space velocity SV of exhaust gases. In this table, the third coefficient K3 is set to a larger value as the space velocity SV is higher, based on a characteristic of the amount of NOx slip dependent on the space velocity SV.

Figure 5:
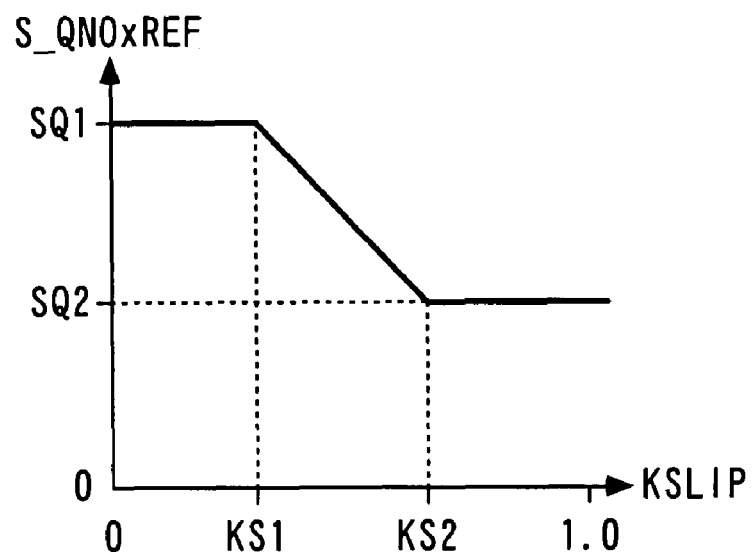
FIG. 5 is a diagram showing an example of an S_QNOxREF table for use in the FIG. 4 process.

Then, in a step 23, a slip coefficient KSLIP is calculated by multiplying the first to third coefficients K1 to K3 calculated in the steps 20 to 22, by each other. In a step 24 following the step 23, the trapped NOx amount reference value S_QNOxREF is determined by searching an S_QNOxREF table shown in FIG. 5 according to the slip coefficient KSLIP, followed by terminating the present process.

In the above S_QNOxREF table, the trapped NOx amount reference value S_QNOxREF is set to a first reference value SQ1 when the slip coefficient KSLIP is not larger than a first predetermined value KS1, whereas when the slip coefficient KSLIP is not smaller than a second predetermined value KS2, it is set to a second reference value SQ2 smaller than the first reference value SQ1. Further, when the slip coefficient KSLIP is between the first and second predetermined values KS1 and KS2, the trapped NOx amount reference value S_QNOxREF is set such that it linearly changes between the first and second reference values SQ1 and SQ2.

As described above, the trapped NOx amount reference value S_QNOxREF is basically set to a smaller value as the slip coefficient KSLIP is larger, i.e. as the estimated amount of NOx slip is larger. Then, the trapped NOx amount reference value S_QNOxREF set as above is compared with the cumulative value S_QNOxLNC of the trapped NOx amount in the step 4 appearing in FIG. 3. As a consequence, the timing for execution of the rich spike is advanced as the predicted amount of NOx slip is larger. This makes it possible to properly set the timing for execution of the rich spike such that the amount of NOx slip is reduced, whereby exhaust emissions can be reduced.

Figure 12:
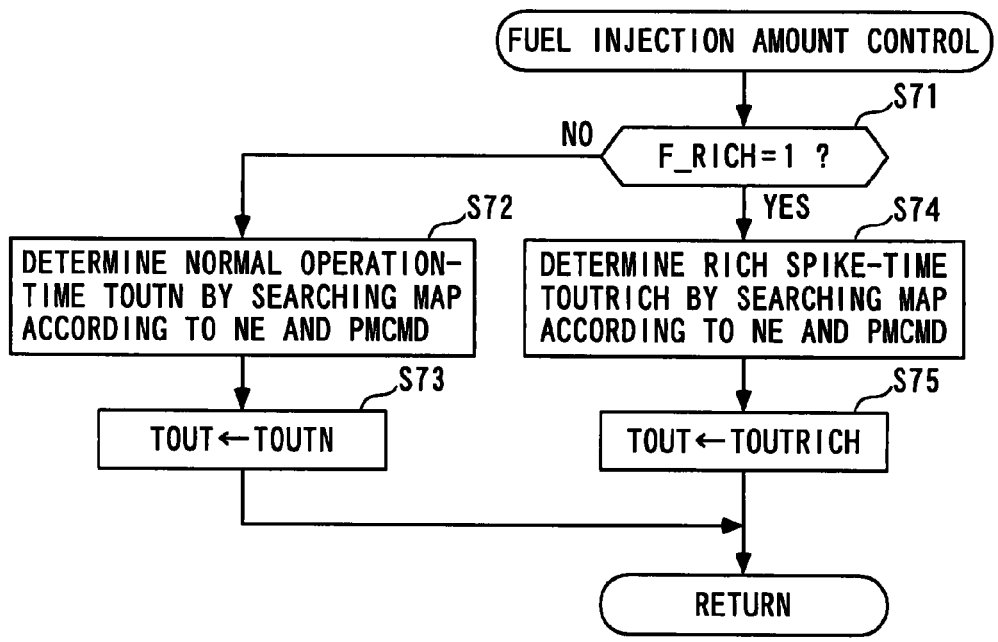
FIG. 12 is a flowchart showing a control process for controlling a fuel injection amount.

FIG. 12 shows a control process for controlling the fuel injection amount. In this process, the fuel injection amount of the injector 6 is controlled according to whether or not the conditions for executing the rich spike are satisfied, which is determined in the FIG. 3 process. First, in a step 71, it is determined whether or not the rich spike flag F_RICH is equal to 1.

If the answer to this question is negative (NO), i.e. if the conditions for executing the rich spike are not satisfied, a normal operation-time fuel injection amount TOUTN is determined by searching a map, not shown, according to the engine speed NE and the demanded torque PMCMD (step 72), and the calculated normal operation-time fuel injection amount TOUTN is set as the fuel injection amount TOUT (step 73), followed by terminating the present process.

On the other hand, if the answer to the question of the step 71 is affirmative (YES), i.e. if the conditions for executing the rich spike are satisfied, a rich spike-time fuel injection amount TOUTRICH is determined by searching a map, not shown, according to the engine speed NE and the demanded torque PMCMD (step 74). The rich spike-time fuel injection amount TOUTRICH is set to a larger value than the value of the normal operation-time fuel injection amount TOUTN.

Then, in a step 75, the rich spike-time fuel injection amount TOUTRICH calculated in the step 74 is set as the fuel injection amount TOUT, followed by terminating the present process.

Figure 13:
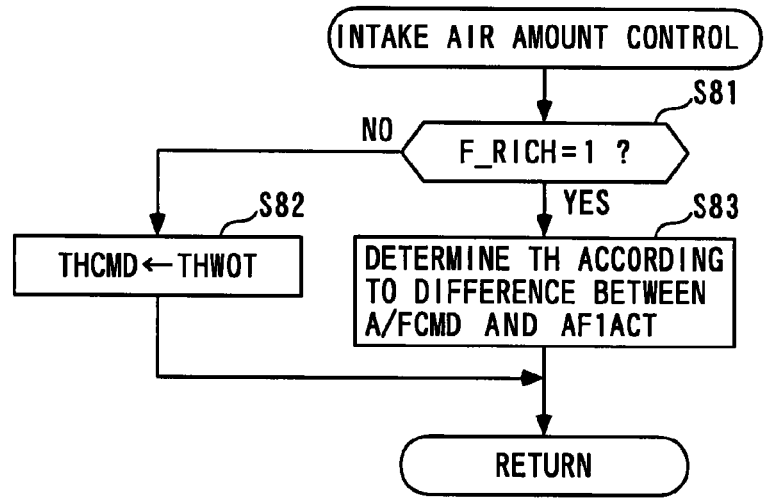
FIG. 13 is a flowchart showing a control process for controlling an intake air amount.

FIG. 13 shows a control process for controlling the intake air amount. In this process, the throttle valve opening TH is controlled according to whether or not the conditions for executing the rich spike are satisfied, whereby the intake air amount QA is controlled. First, in a step 81, it is determined whether or not the rich spike flag F_RICH is equal to 1.

If the answer to this question is negative (NO), i.e. if the conditions for executing the rich spike are not satisfied, a target throttle valve opening THCMD is set to a full opening THWOT (step 82), followed by terminating the present process.

On the other hand, if the answer to the question of the step 81 is affirmative (YES), i.e. if the conditions for executing the rich spike are satisfied, a rich spike-time throttle valve opening TH is determined based on the difference between the target air-fuel ratio AFCMD calculated in the step 8 in FIG. 3 and the first actual air-fuel ratio AF1ACT (step 83), followed by terminating the present process.

As described above, the rich spike is performed by making the fuel injection amount TOUT larger and the intake air amount QA smaller through control of the throttle valve 12, than during normal operation of the engine 3. It should be noted that the intake air amount QA may be controlled by controlling the supercharging device 7, the swirl device 13, or the EGR device 14 in place of or in combination of control of the throttle valve 12.

It should be noted that the present invention is by no means limited to the embodiment described above, but it can be practiced in various forms. For example, although in the above-described embodiment, the three-way catalyst 16 is used as a catalyst having the function of eliminating NOx, this is not limitative, but other suitable catalysts can be employed. For example, a catalyst having the function of occluding or reducing NOx contained in exhaust gases under an oxidizing atmosphere, or the function of occluding a reducing agent under a reducing atmosphere and emitting the reducing agent under an oxidizing atmosphere.

Further, although in the above-described embodiment, the NOx purification ratio PTWC of the three-way catalyst 16 is calculated based on both the three-way catalyst temperature TTWC and the space velocity SV of exhaust gases, this is not limitative, but the NOx purification ratio PTWC may be calculated based on either of them. Further, this also applies to calculation of the NOx trapping ratio PLNC of the NOx catalyst 17. That is, the NOx trapping ratio PLNC may be calculated based on either the NOx catalyst temperature TLNC or the space velocity SV.

Further, although in the above-described embodiment, during the rich spike, the reducing agent is supplied by increasing the fuel injection amount by the injector 6, this is not limitative, but another injector may be disposed in an exhaust port of the exhaust pipe 5 such that a reducing agent is directly injected into exhaust gases, by way of example. Furthermore, the present invention may be applied not only to the diesel engine installed on a vehicle but also to a gasoline engine, such as a lean burn engine. Further, the present invention can be applied to various types of industrial internal combustion engines including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. An exhaust emission control device for an internal combustion engine, for purifying exhaust gases emitted from the engine into an exhaust system, comprising:
   a catalyst that is disposed in the exhaust system and has a function of purifying NOx under a reducing atmosphere;
   a NOx catalyst that is disposed at a location downstream of said catalyst in the exhaust system, for trapping NOx contained in exhaust gases under an oxidizing atmosphere, and reducing the trapped NOx under the reducing atmosphere, thereby purifying the trapped NOx;
   oxygen concentration-detecting means that is disposed between said catalyst and said NOx catalyst, for detecting a concentration of oxygen in the exhaust gases;
   NOx emission amount-estimating means for estimating an amount of NOx contained in the exhaust gases emitted from the engine, as a NOx emission amount;
   purification performance parameter-calculating means for calculating a purification performance parameter indicative of a NOx purification performance of said catalyst;
   NOx emission amount-correcting means for correcting the estimated NOx emission amount according to the calculated purification performance parameter;
   trapped NOx amount-calculating means for calculating an amount of NOx trapped by said NOx catalyst as a trapped NOx amount based on the corrected NOx emission amount;
   trapped NOx amount cumulative value-calculating means for calculating a total amount of NOx trapped by said NOx catalyst as a trapped NOx amount cumulative value, based on the calculated trapped NOx amount;
   NOx reduction control means for supplying a reducing agent to an upstream side of said catalyst when the calculated trapped NOx amount cumulative value is equal to or greater than a trapped NOx amount reference value, for controlling the exhaust gases flowing into said NOx catalyst by NOx reduction control such that the exhaust gases are under the reducing atmosphere, thereby causing said NOx catalyst to carry out an operation for reducing Nox;
   reducing agent amount reference value-setting means for setting a reducing agent amount reference value corresponding to the amount of reducing agent required for reduction of the NOx trapped in said NOx catalyst;
   reducing agent amount-calculating means for calculating an amount of reducing agent supplied to said NOx catalyst during the NOx reduction control, based on the detected oxygen concentration;
   reducing agent amount cumulative value-calculating means for calculating a total amount of reducing agent actually supplied to said NOx catalyst by the NOx reduction control as a reducing agent amount cumulative value, based on the calculated reducing agent amount; and
   NOx reduction control-terminating means for terminating the NOx reduction control when the calculated reducing agent amount cumulative value is greater than the set reducing agent amount reference value.

2. An exhaust emission control device as claimed in claim 1, further comprising occluded NOx amount-calculating means for calculating an amount of NOx occluded in said catalyst as an occluded NOx amount,
   wherein said purification performance parameter-calculating means calculates the purification performance parameter according to the calculated occluded NOx amount.

3. An exhaust emission control device as claimed in claim 1, further comprising at least one of catalyst temperature-detecting means for detecting temperature of said catalyst, and space velocity-detecting means for detecting a space velocity of exhaust gases,
   wherein said purification performance parameter-calculating means calculates the purification performance parameter according to at least one of the detected temperature of said catalyst and the detected space velocity of exhaust gases.

4. An exhaust emission control device as claimed in claim 1, further comprising NOx trapping degree-calculating means for calculating a degree of trapping of NOx by said NOx catalyst,
wherein said trapped NOx amount-calculating means calculates the trapped NOx amount further according to the calculated degree of trapping of NOx.

5. An exhaust emission control device as claimed in claim 4, further comprising at least one of NOx catalyst temperature-detecting means for detecting temperature of said NOx catalyst, and space velocity-detecting means for detecting a space velocity of exhaust gases,
wherein said NOx trapping degree-calculating means calculates the degree of trapping of NOx according to at least one of the detected temperature of said NOx catalyst and the detected space velocity of exhaust gases.

6. An exhaust emission control method of purifying exhaust gases emitted from an internal combustion engine into an exhaust system thereof, the engine including the exhaust system, a catalyst that is disposed in the exhaust system and has a function of purifying NOx under a reducing temperature, a NOx catalyst that is disposed at a location downstream of said catalyst in the exhaust system, for trapping NOx contained in exhaust gases under an oxidizing atmosphere, and reducing the trapped NOx under the reducing atmosphere, thereby purifying the trapped NOx, and an oxygen concentration-detecting means that is disposed between said catalyst and said NOx catalyst, for detecting a concentration of oxygen in the exhaust gases, the exhaust emission control method comprising:
a NOx emission amount-estimating step of estimating an amount of NOx contained in the exhaust gases emitted from the engine, as a NOx emission amount;
a purification performance parameter-calculating step of calculating a purification performance parameter indicative of a NOx purification performance of the catalyst;
a NOx emission amount-correcting step of correcting the estimated NOx emission amount according to the calculated purification performance parameter;
a trapped NOx amount-calculating step of calculating an amount of NOx trapped by the NOx catalyst as a trapped NOx amount based on the corrected NOx emission amount;
a trapped NOx amount cumulative value-calculating step of calculating a total amount of NOx trapped by said NOx catalyst as a trapped NOx amount cumulative value, based on the calculated trapped NOx amount;
a NOx reduction control step of supplying a reducing agent to an upstream side of the catalyst when the calculated trapped NOx amount cumulative value is equal to or greater than a trapped NOx amount reference value, for controlling the exhaust gases flowing into the NOx catalyst by NOx reduction control such that the exhaust gases are under the reducing atmosphere, thereby causing the NOx catalyst to carry out an operation for reducing Nox;
a reducing agent amount reference value-setting step of setting a reducing agent amount reference value corresponding to the amount of reducing agent required for reduction of the NOx trapped in said NOx catalyst;
a reducing agent amount-calculating step of calculating an amount of reducing agent supplied to said NOx catalyst during the NOx reduction control, based on the detected oxygen concentration;
a reducing agent amount cumulative value-calculating step of calculating a total amount of reducing agent actually supplied to said NOx catalyst by the NOx reduction control as a reducing agent amount cumulative value, based on the calculated reducing agent amount; and
a NOx reduction control-terminating step of terminating the NOx reduction control when the calculated reducing agent amount cumulative value is greater than the set reducing agent amount reference value.

7. An exhaust emission control method as claimed in claim 6, further comprising an occluded NOx amount-calculating step of calculating an amount of NOx occluded in the catalyst as an occluded NOx amount,
wherein said purification performance parameter-calculating step includes calculating the purification performance parameter according to the calculated occluded NOx amount.

8. An exhaust emission control method as claimed in claim 6, further comprising at least one of a catalyst temperature-detecting step of detecting temperature of the catalyst, and a space velocity-detecting step of detecting a space velocity of exhaust gases,
wherein said purification performance parameter-calculating step includes calculating the purification performance parameter according to at least one of the detected temperature of the catalyst and the detected space velocity of exhaust gases.

9. An exhaust emission control method as claimed in claim 6, further comprising a NOx trapping degree-calculating step of calculating a degree of trapping of NOx by the NOx catalyst,
wherein said trapped NOx amount-calculating step includes calculating the trapped NOx amount further according to the calculated degree of trapping of NOx.

10. An exhaust emission control method as claimed in claim 9, further comprising at least one of a NOx catalyst temperature-detecting step of detecting temperature of the NOx catalyst, and a space velocity-detecting step of detecting a space velocity of exhaust gases,
wherein said NOx trapping degree-calculating step includes calculating the degree of trapping of NOx according to at least one of the detected temperature of the NOx catalyst and the detected space velocity of exhaust gases.

11. An engine control unit including a non-transitory control program for causing a computer to execute an exhaust emission control method of purifying exhaust gases emitted from an internal combustion engine into an exhaust system thereof, the engine including the exhaust system, a catalyst that is disposed in the exhaust system and has a function of purifying NOx under a reducing atmosphere, a NOx catalyst that is disposed at a location downstream of said catalyst in the exhaust system, for trapping NOx contained in exhaust gases under an oxidizing atmosphere, and reducing the trapped NOx under the reducing atmosphere, and an oxygen concentration-detecting means disposed between said catalyst and said NOx catalyst, thereby purifying the trapped NOx,
wherein the control program causes the computer to detect a concentration of oxygen in the exhaust gases, to estimate an amount of NOx contained in the exhaust gases emitted from the engine, as a NOx emission amount, calculate a purification performance parameter indicative of a NOx purification performance of the catalyst, correct the estimated NOx emission amount according to the calculated purification performance parameter, calculate an amount of NOx trapped by the NOx catalyst as a trapped NOx amount based on the corrected NOx emission amount, calculate a total amount of NOx trapped by said NOx catalyst as a trapped NOx amount cumulative value, based on the calculated trapped NOx amount, supply a reducing agent to an upstream side of the catalyst when the calculated trapped NOx amount cumulative value is equal to or greater than a trapped NOx amount reference value, for controlling the exhaust gases flowing into the NOx catalyst by NOx reduction control such that the exhaust gases are under the reducing atmosphere, thereby causing the NOx catalyst to carry out an operation for reducing NOx, setting a reducing agent amount reference value corresponding to the amount of reducing agent required for reduction of the NOx trapped in said NOx catalyst, calculating an amount of reducing agent supplied to said NOx catalyst during the NOx reduction control, based on the detected oxygen concentration, calculating a total amount of reducing agent actually supplied to said NOx catalyst by the NOx reduction control as a reducing agent amount cumulative value, based on the calculated reducing agent amount, and terminating the NOx reduction control when the calculated reducing agent amount cumulative value is greater than the set reducing agent amount reference value.

12. An engine control unit as claimed in claim 11, wherein the control program causes the computer to calculate an amount of NOx occluded in the catalyst as an occluded NOx amount, and calculate the purification performance parameter according to the calculated occluded NOx amount.

13. An engine control unit as claimed in claim 11, wherein the control program causes the computer to perform at least one of detection of temperature of the catalyst, and detection of a space velocity of exhaust gases, and calculate the purification performance parameter according to at least one of the detected temperature of the catalyst and the detected space velocity of exhaust gases.

14. An engine control unit as claimed in claim 11, wherein the control program causes the computer to calculate a degree of trapping of NOx by the NOx catalyst, and calculate the trapped NOx amount further according to the calculated degree of trapping of NOx.

15. An engine control unit as claimed in claim 14, wherein the control program causes the computer to perform at least one of detection of temperature of the NOx catalyst, and detection of a space velocity of exhaust gases, and calculate the degree of trapping of NOx according to at least one of the detected temperature of the NOx catalyst and the detected space velocity of exhaust gases.

* * * * *